Feb. 12, 1924.
D. C. CARROLL
RIM TOOL
Filed Sept. 21, 1917      2 Sheets-Sheet 1
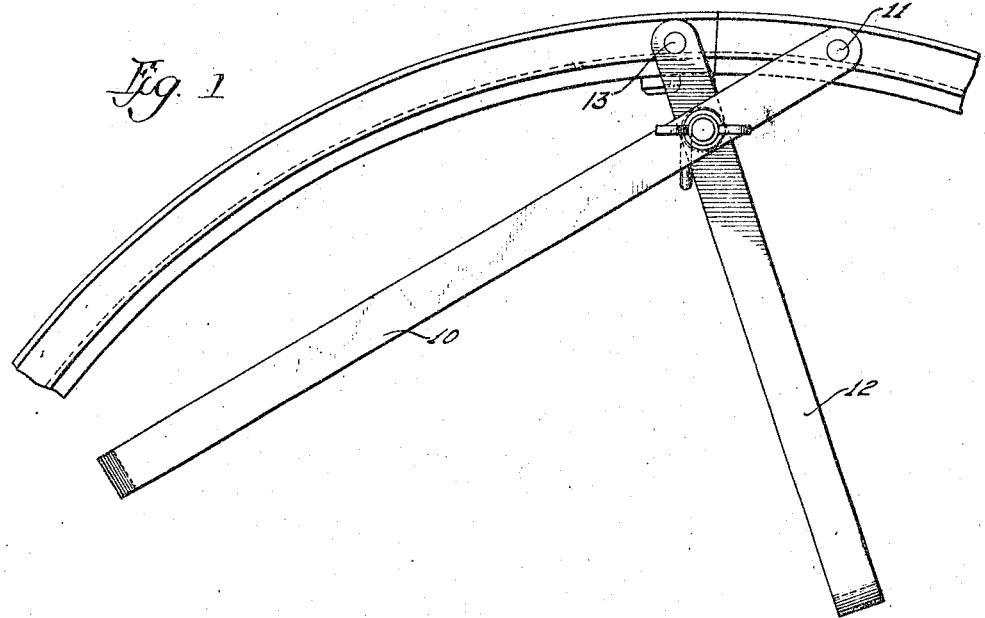
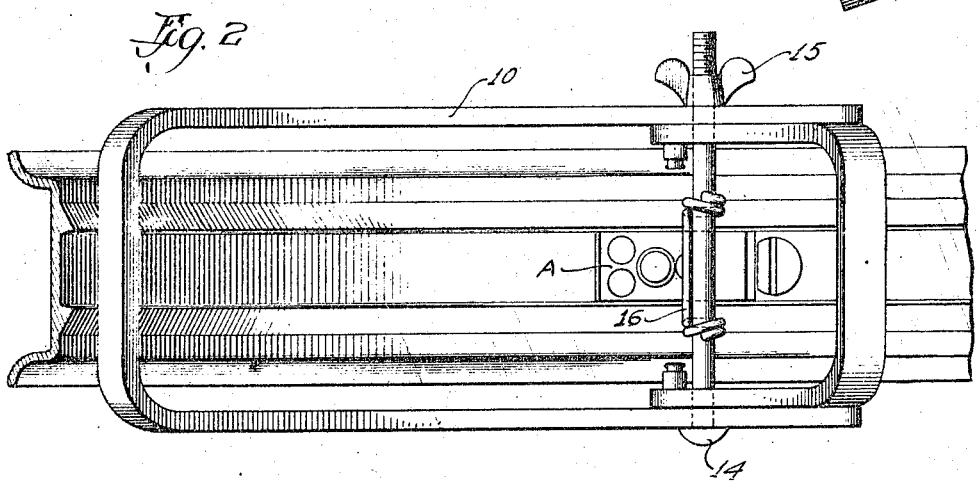

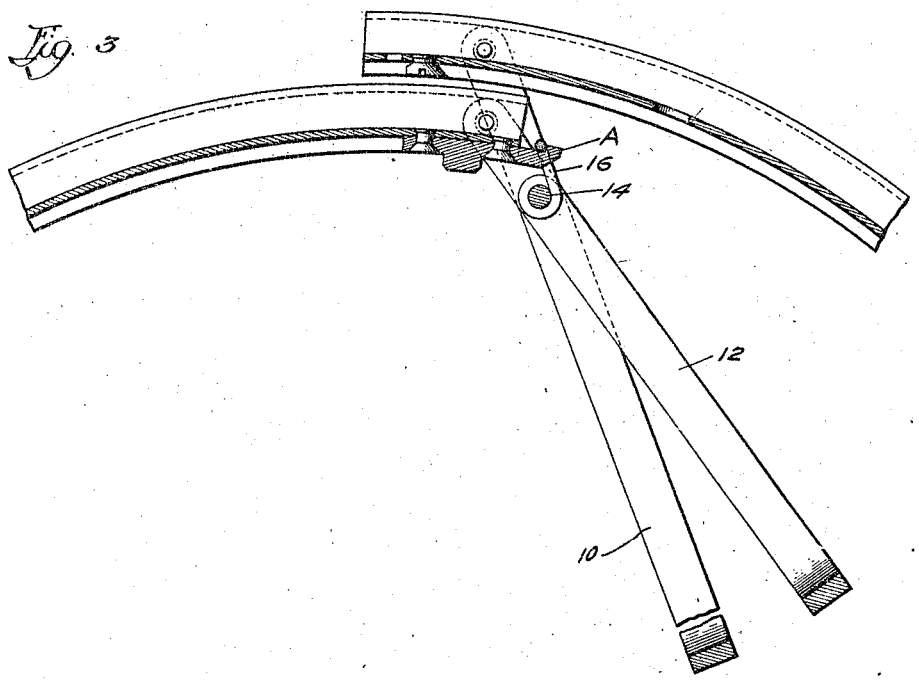
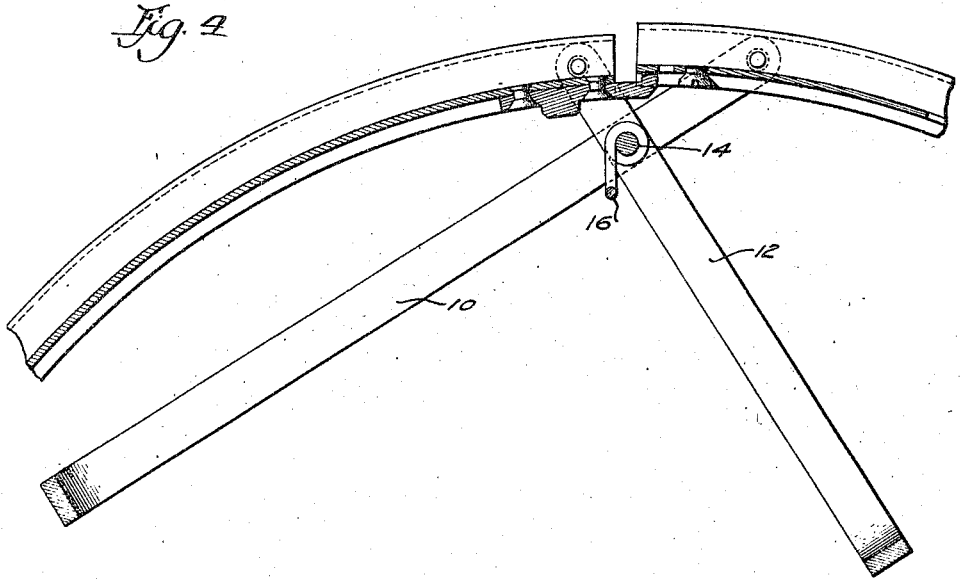

Patented Feb. 12, 1924.

1,483,841

UNITED STATES PATENT OFFICE.

DALLAS C. CARROLL, OF AKRON, OHIO, ASSIGNOR TO THE FIRESTONE TIRE & RUBBER COMPANY, OF AKRON, OHIO, A CORPORATION OF OHIO.

RIM TOOL.

Application filed September 21, 1917. Serial No. 192,490.

*To all whom it may concern:*

Be it known that I, DALLAS C. CARROLL, a citizen of the United States, residing at Akron, in the county of Summit and State of Ohio, have invented certain new and useful Improvements in Rim Tools, of which the following is a specification.

A great many tools have been devised for collapsing or breaking split rims which have not been entirely satisfactory. Many have been too complicated to be practical, and some of the more simple type have not been successful in operating large size rims. It has been the purpose of this invention to construct a rim contracting or breaking tool which shall be simple in design, easy to operate, and safe in all positions. To insure that the rim tool will hold the rims in collapsed position, and that there will be no danger of the rim springing into closed position while the driver is manipulating the tire, I have provided a lock or latch which will positively hold the rim in its collapsed position. A frequent objection to rim tools now on the market is that while the tool will move the ends of the rim out of line in collapsing, but when it is desired to restore the rim to a true circle, the ends of the rim will strike and it is necessary to pry the overlapping ends with a screw driver or other implement to cause the rim ends to pass into line. It is one of the objects of this invention to so construct the rim tool that it is possible to expand the rim slightly, whereupon the rim ends will pass into line and there will be no interference at this point in restoring the rim to a true circle.

These and other objects will appear as the description of the invention proceeds, reference being had to the accompanying drawings, in which:

Fig. 1 is a side elevation of a portion of a rim showing the improved tool clamped in position on the rim and ready to operate to collapse the rim.

Fig. 2 is a view looking down on the rim and tool.

Fig. 3 is a longitudinal section through a rim showing the same in contracted or collapsed position and with the lock in position to hold the rim, and,—

Fig. 4 is a longitudinal section through a rim showing the manner in which the tool may be manipulated to expand the rim slightly thereby enabling the rim ends to pass into line.

The rim tool devised by me comprises two U-shaped or bifurcated levers which are pivoted to one another and are provided on the extremities with means to engage the ends of the rim, there being also provided a device by which the two ends of the arms may be drawn together to clamp the rim. One of the U-shaped arms or levers is shown at 10 and at its extremities carries pins 11 which are adapted to enter holes in one end of the rim near the split. The other U-shaped arm or lever is indicated at 12 and carries similar pins 13 adapted to enter holes in the other end of the rim. The arm 12 is preferably shorter than the arm 10 and is located between the parallel side bars of the arm 10. A contracting bolt 14 is loosely mounted in the arms 10 and 12 and serves as a pivot around which the levers may move. One end of the bolt is screw-threaded and is provided with a wing nut 15 by which the ends of the arms may be drawn together after the pins 11 and 13 have been placed in their respective apertures, thus securely locking the tool in position.

Loosely mounted on the central portion of the bolt 14 is a swinging catch or hook 16 which is preferably made of a piece of coiled wire having a central straight piece and two terminal coils, received around the contracting bolt 14.

The operation of the device is very simple and can be easily understood. The wing nut 15 being withdrawn on the end of the bolt 14 the levers 10 and 12 are placed to enclose the rim ends and the wing nut is tightened to drive the pins in the apertures. The tool being in the position shown in Figure 1, the operator grasps the longer lever 10 and moves it to the right of the figure and the rim is collapsed or contracted to the position shown in Figure 3. The hook 16 is now swung around on the contracting bolt until it takes over the end of the rim latch A. This serves to hold the rim in collapsed position and there is no danger of it flying back into position, which might result in injuring the operator. When it is desired to aline the ends of the rim the hook is swung out of engagement with the latch and the rim ends will re-adjust themselves. The ends, however, will not pass into line on springing back as the end carrying the latch will interfere with the other end. By moving the lever 12 toward the right, as shown in Figure 4, it is possible to expand the rim slightly enabling the two ends to pass into line without interference.

It is obvious that various changes and modifications may be made in the form of tool shown here. It is possible to provide alternative constructions to accomplish the same results, such, for instance, as changing the form of lock for holding the rim in collapsed position or arranging it to engage with a different portion of the rim. These and other changes may be made without departing from the spirit of the invention.

I claim:

1. A rim contracting tool comprising a lever, means carried by said lever to engage both sides of a rim end, so as to move it in either direction endwise, a second lever, means carried by said second lever adapted to engage both sides of the other rim end, so as to move it in either direction endwise, and means passing through said levers intermediate their ends, forming a pivotal connection between them and providing operating extensions for each lever.

2. A rim contracting tool comprising a U shaped lever, means carried by arms of said lever to engage both sides of a rim end so as to move it in either direction endwise, a second U shaped lever, means carried by the arms of said second lever adapted to engage both sides of the other rim end, and means passing through said levers intermediate their ends, forming a pivotal connection between them and providing operating extensions for each lever.

3. A rim contracting tool comprising a lever, means carried by said lever to engage both sides of a rim end, so as to move it in either direction endwise, a second lever, means carried by said second lever adapted to engage both sides of the other rim end, so as to move it in either direction endwise, and means passing through said levers intermediate their ends, forming a pivotal connection between them and providing operating extensions for each lever, and means associated with said tool to hold the rim and tool in contracted position.

4. A rim contracting tool comprising a U-shaped lever, pins carried by said lever adapted to engage a rim end, a second U-shaped lever, pins carried by said second lever adapted to engage the other rim end, a bolt passing through said levers forming a pivotal connection between them, and a swinging catch on said bolt, adapted to engage a portion of said rim to hold the rim and the tool in contracted position.

DALLAS C. CARROLL.

Witness:
A. L. ELY.